United States Patent [19]

Parekh

[11] Patent Number: 4,485,222

[45] Date of Patent: Nov. 27, 1984

[54] THERMOSETTING POLYURETHANE COMPOSITIONS

[75] Inventor: Girish G. Parekh, Fairfield, Conn.

[73] Assignee: American Cyanamid Company, Stamford, Conn.

[21] Appl. No.: 479,530

[22] Filed: Mar. 28, 1983

[51] Int. Cl.³ .................. C08L 61/28; C08L 67/02
[52] U.S. Cl. ............................... 525/517; 427/388.3; 428/458; 428/460; 428/463; 525/127; 525/130; 525/440; 525/518; 525/520; 528/59; 528/66; 528/67
[58] Field of Search ............... 525/127, 130, 162, 163, 525/440, 518, 520, 517; 528/67, 59, 66

[56] References Cited

U.S. PATENT DOCUMENTS 3,557,043  1/1971  Krauss et al. .................. 525/162
3,573,248  3/1971  Pedain .......................... 525/472

*Primary Examiner*—Theodore E. Pertilla

*Attorney, Agent, or Firm*—Steven J. Hultquist; Gordon L. Hart

[57] ABSTRACT

Thermosetting polyurethane compositions comprising a polymer having a molecular weight of from 500 to 10,000 and containing from about 0.3 to about 15 percent by weight of one or more functional groups selected from the group consisting of —OH, —COOH, —CONH$_2$ and

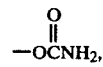

and a mixture of monomeric and oligomeric polyfunctional substituted urethane compounds, which may be derived by reaction of a polyol and isocyanic acid, followed by methylolation and alkylation. Such compositions may be cured at elevated temperature to produce solvent-resistant coatings.

16 Claims, No Drawings

THERMOSETTING POLYURETHANE COMPOSITIONS

BACKGROUND OF THE INVENTION

1. Field of the Invention

This invention generally relates to thermosetting polyurethane compositions and specifically relates to cross-linkable compositions comprising a resin having hydroxy, carboxylic acid, amide or carbamate functional groups, and a mixture of monomeric and oligomeric polyfunctional substituted urethane compounds.

2. Description of the Prior Art

In the broad practice of the coatings art, it is known to formulate coatings containing resins with free hydroxyl groups which are blended with melamine resins under acidic conditions to provide film-forming lacquers. The dry film coatings produced by such compositions are tough and exhibit high resistance to degradation caused by air oxidation and light exposure.

U.S. Pat. No. 3,557,043 discloses an improved coating composition based on polyacrylate resins with hydroxyl functionality and containing N-alkoxy-methylurethanes, wherein from about 0 to about 70% by weight of the urethane component may be replaced by a melamine formaldehyde and/or urea formaldehyde resin. Such urethane-based compositions are disclosed as having high elasticity, impact strength and solvent resistance relative to the lacquer compositions mentioned above.

The N-alkoxy-methylurethanes employed in the compositions discussed immediately above are disclosed as being obtainable as a reaction product of a polyhydroxyl compound and an alkoxymethyl isocyanate of the formula $ROCH_2-NCO$, wherein R is an alkyl or alkylene radical having one to 12 carbon atoms. Unfortunately, however, such alkoxymethyl isocyanates are highly toxic in character and are at least suspected carcinogens. Further although the N-alkoxy-methylurethanes employed in the prior art coating compositions is polyfunctional in character, such urethanes are monomeric in character and thus do not provide the cross-linkability associated with oligomeric or polymeric polyfunctional compounds.

Accordingly, it is an object of the present invention to provide a coating composition containing a cross-linkable polymer and polyfunctional substituted urethane compounds, wherein the latter may be prepared from safe, easily handled, non-toxic starting materials, with the resultant coating composition being curable at elevated temperature to provide a highly cross-linked coating having high solvent resistance, and otherwise good dry film properties, as well as high resistance to weathering, including resistance to light and oxidative degradation.

SUMMARY OF THE INVENTION

In one aspect, the invention relates to a thermosetting polyurethane composition comprising:

(a) a polymer having molecular weight of from 500 to 20,000 and containing from about 0.3 to about 15 percent by weight based on total weight of said polymer, of one or more free functional groups selected from —OH, —COOH, —CONH$_2$ and —OCNH$_2$; and (b) a mixture of monomeric and oligomeric urethane compounds, selected from the groups consisting of: (i) monomeric compounds of the formula $$[A]\left[O-\overset{O}{\underset{\|}{C}}-N\diagup^{R_1}_{\diagdown R_2}\right]_x$$

wherein:
A is a di- to hexavalent organic moiety;
X is an integer from 2 to 6;
$R_1$ is hydrogen, —CH$_2$OH or —CH$_2$OR$_3$;
$R_2$ is —CH$_2$OH or —CH$_2$OR$_3$; and
$R_3$ is C$_1$ to C$_4$ alkyl,
and (ii) oligomeric compounds of the formula $$[A]\left[\begin{array}{c}O-\overset{O}{\underset{\|}{C}}-N\diagup^{R_1}_{\diagdown R_2}\\ O-\overset{}{\underset{\|}{C}}-N-CH_2-N-\overset{}{\underset{\|}{C}}-O+A\end{array}\right]_y \left[O-\overset{}{\underset{\|}{C}}-N\diagup^{R_1}_{\diagdown R_2}\right]_w \left[O-\overset{}{\underset{\|}{C}}-N\diagup^{R_1}_{\diagdown R_2}\right]_n$$

wherein:
A, $R_1$ and $R_2$ are as defined in (i)
n is an integer from 1 to 5
w is an integer from 0 to 4
y is an integer from 1 to 5

In another aspect, the invention relates to a polyurethane coating formed on a substrate by curing thereon the thermosetting polyurethane composition as described above.

In yet another aspect of the invention, a method is provided for forming a polyurethane coating on a substrate, comprising applying to the substrate a wet film of the above-mentioned thermosetting composition, and curing same at temperature in the range of from about 80° to about 200° C.

The urethane mixture of the above-described thermosetting composition suitably may be derived by reaction of a polyol and isocyanic acid (HNCO), followed by methylolation with an aldehyde and alkylation with an alcohol.

DETAILED DESCRIPTION OF THE INVENTION

The cross-linkable polymer employed in the thermosetting polyurethane composition of the invention may suitably have a molecular weight of from about 500 to about 20,000 and contain from about 0.3 to about 15 percent by weight, based on total weight of the polymer, of one or more free functional groups selected from —OH, —COOH, —CONH$_2$ and

Suitably, a single polymer or a blend of polymers as desired may be employed, with the polymers having any one of the above-mentioned reactive groups, or a combination thereof. Suitable polymers include polyesters, polyethers, acrylics, vinyl polymers, polyolefins, and mixtures thereof.

The cross-linking agent for the above-described polymeric components of the thermosetting composition is a mixture of monomeric and oligomeric polyfunctional substituted urethane compounds selected from the group consisting of:

(a) a polymer having molecular weight of from 500 to 20,000 containing from about 0.3 to about 15 percent by weight based on total weight of said polymer, of one or more free functional groups selected from —OH,

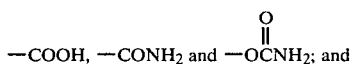

(b) a mixture of monomeric and oligomeric urethane compounds, selected from the groups consisting of: (i) monomeric compounds of the formula

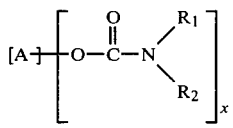

wherein:
A is a di- to hexavalent organic moiety;
X is an integer from 2 to 6;
$R_1$ is hydrogen, —CH$_2$OH or —CH$_2$OR$_3$;
$R_2$ is —CH$_2$OH or —CH$_2$OR$_3$; and
$R_3$ is $C_1$ to $C_4$ alkyl,
and (ii) oligomeric compounds of the formula

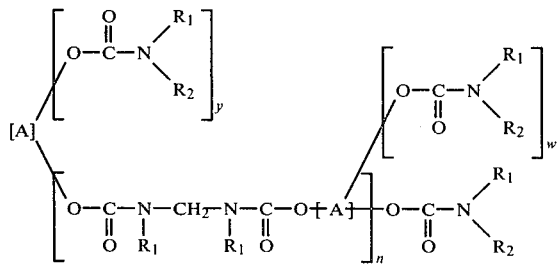

wherein:
A, $R_1$ and $R_2$ are as defined in (1)
n is an integer from 1 to 5
w is an integer from 0 to 4
y is an integer from 1 to 5
This cross-linking mixture behaves like an amino cross-linking agent in its cure chemistry but the resultant film produced is a polyurethane, with the attendant advantages of polyurethane coatings, i.e., flexibility, film toughness and heat and light stability.

The monomeric component of the urethane mixture (b) may be a partially or fully alkylated bis, tris, or polymethylol or alkoxymethyl carbamate (N-substituted urethane) of the formula given wherein A, the di- to hexavalent organic moiety, may be: aliphatic; aromatic with extra-cyclic aliphatic substituents (to which the appended carbamate terminal groups are joined), e.g., aralkyl; or heterocyclic. A is suitably an aliphatic radical having methylene (—CH$_2$) groups bridging to the appended carbamate terminal groups,

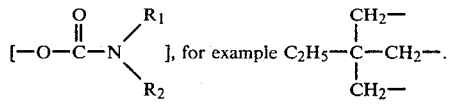

The oligomeric polyfunctional substituted urethane compounds in the cross-linking mixture may, as shown in the above formula therefor, contain from one to five N-substituted methylurethane repeating units, the organic moiety [A] of which may contain from 0 to 4 appended N-substituted carbamate N groups, depending on the valence of A. As is apparent from the formula given above for the oligomeric compounds of the cross-linking mixture, the presence of the oligomers provides numerous cross-linking functional groups, above those present due to the monomeric compounds in the mixture. Accordingly, the presence of the oligomeric compounds insure a high density of cross-linking in the final film product, contributing to its toughness and solvent resistance, while the presence of monomeric compounds in the cross-linker impart flexibility to the final film product.

The thermosetting polyurethane composition described above comprising a cross-linkable polymer and the monomeric and oligomeric urethane cross-linking mixture, may further contain a cross-linkingly effective amount of an acid catalyst for effecting the cross-linking reaction. Suitable acid catalysts for such purpose include sulfonic acids, carboxylic acids and phosphoric acid esters; sulfonic acids are preferred.

The thermosetting composition may also include an amino-formaldehyde resin, preferably at least partially alkylated. Such resins may for example include melamine-formaldehyde resins, glycourilformaldehyde resins, urea-formaldehyde resins, and benzoguanamine-formaldehyde resins.

A particularly advantageous thermosetting composition within the context of the foregoing comprises from about 50 to about 90% by weight of polymer (A), from about 10 to about 50 percent by weight of urethane mixture (B), from about 0 to about 40% by weight of an at least partially alkylated amino-formaldehyde resin and from about 0.1 to about 5 percent by weight of an acid catalyst for cross-linking polymer (A) and urethane mixture (B).

The monomeric and oligomeric urethane cross-linking mixture may suitably be derived as a reaction product of a polyol and isocyanic acid (HNCO), followed by methylolation and alkylation of the reaction product. Suitable polyols for such purpose include trimethylolpropane; ethylene glycol; 1,3-butanediol; 1,4-butanediol; cyclohexane-dimethanol; neopentyl glycol; polyether polyols; and polyester diols. A particularly useful thermosetting composition is obtained when the monomeric and oligomeric urethane mixture is derived by reaction of 1,1,1-trimethylolpropane and isocyanic acid, followed by methylolation with formaldehyde and alkylation with methanol. Such reaction scheme produces a monomeric urethane compound of the following formula:

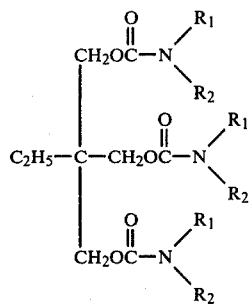

and corresponding oligomers having between one and five N-substituted methylurethane repeating units.

Although the thermosetting composition of the present invention has broad utility for adhesives, coatings and molding compounds, it is particularly useful in film-forming coatings applications, wherein polyurethane systems are desired, but without the necessity of using polyisocyanates as precursors or raw materials.

The thermosetting compositions of the present invention may contain suitable solvents or diluents as necessary or desirable for the specific end use application, as well as suitable additives, such as pigments, plasticizers, stabilizers, extenders as well as any other additives which are suitable for the desired end use and are compatible with the composition.

The composition of the present invention may be employed to form a polyurethane coating on a substrate by application to the substrate of a wet film of the composition. The wet film may then be cured at an elevated temperature in the range of from about 80° to about 200° C. Alternatively, the applied wet film may be cured at ambient temperature, in the presence of a suitable ambient-cure catalyst in the composition.

The examples set forth hereinafter are illustrative of the practice of the invention, and are not intended to be construed in any limiting manner as regards the broad applicability of the invention. All parts and percentages are by weight, unless otherwise specified.

EXAMPLE I

Urethane A 80.4 g. (0.6 moles) of 1,1,1-trimethylolpropane were dissolved in 225 ml. glyme and 1 g. of anhydrous HCl dissolved in the solution. To this a 20% solution of isocyanic acid (77.4 g., 1.8 moles) in glyme was added slowly. The reaction was exothermic, with the temperature rising to 65° C. The reaction flask was cooled with ice water till the temperature dropped to 17° C. Heavy white precipitates were formed after complete addition of isocyanic acid. The reaction mixture was stirred for an additional 4 hours and then allowed to stand overnight at ambient temperature. The white solids were filtered and washed with glyme and later recrystallized from ethanol. The structure of the recrystallized solid was confirmed by I.R. and N.M.R. to be a triscarbamate compound of the formula:

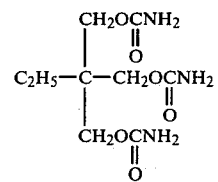

having a melting point of 161° C. This compound is hereinafter denoted Urethane A.

Urethane B 90.0 g. (1.0 mole) of 1,4-butanediol was similarly reacted with isocyanic acid (86 g.; 2.0 moles). The resulting biscarbamate after recrystallization from methanol had a melting point of 198° C. This compound is hereinafter denoted Urethane B.

Urethanes C and D

Similarly, Urethanes C and D are prepared by reacting equivalent amounts of isocyanic acid with neopentylglycol and Esterdiol ®204, respectively.

EXAMPLE II

Methylolation and Methylation of Urethanes

In a suitably equipped flask, 57 g. of 44% aqueous formaldehyde (0.82 mole) (0.16 mole)) of Urethane A were charged. The pH of the slurry was adjusted to 9.6. The reaction mixture was heated on a steam bath for about 10 minutes until it became a clear solution. From the clear solution water and unreacted formaldehyde were stripped under reduced pressure at 60° C. To the resulting syrup (69 g.) were added 500 ml methanol and 5 ml. con. HNO$_3$ (pH=0.5). The reaction solution was heated to 60°-65° C. for one hour, cooled and neutralized with caustic solution. Excess methanol and residual water were removed under reduced pressure at 100° C. The residue was filtered out. 70 g. of clear water-white syrupy product was obtained. Its structure was confirmed by I.R. and N.M.R. to be:

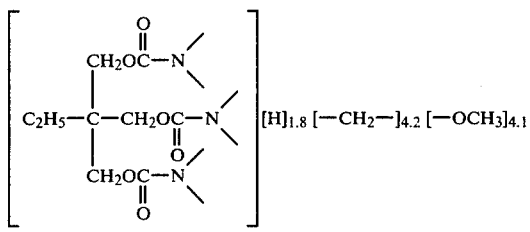

Wet analysis showed no free methylol groups. This product is hereinafter denoted Product A.

Similarly, Urethanes B, C, and D are methylolated with 3.0 moles of formaldehyde per mole of urethane and thereafter methylated with excess methanol in the presence of a nitric acid catalyst. The resulting products are hereinafter designated as Product B, Product C, and Product D, respectively.

EXAMPLE III 10 g. of a commercially available hydroxy group containing polyester resin, Multron R-12 (Moby) was blended with 4 g. of Product A, and 0.1 ml of 70% solution of n-dodecylbenzenesulfonic acid catalyst. The blend was cast into films on zinc phosphate pretreated cold rolled steel and alodine aluminum panels. The films were cured at 150° C./30 min. and 175° C./30 min. The cured films of 1.5 mil film thickness had pencil hardness HB-F, reverse impact of 20 in-lbs and 200+ acetone rub resistance.

EXAMPLE IV 10 g. of Multron R-12 is blended with 4 g. of Product A, and 2 g. of a methylated melamine-formaldehyde resin (Cymel®325, American Cyanamid Company) and 0.1 ml of 70% solution of n-dodecylbezene sulfonic acid. This blend is cast into films on zinc-phosphate preheated cold rolled steel and baked at 150° C. The cured films are hard and resistant to MEK rubbing.

EXAMPLE V 87.5 g. of a commercially available hydroxy group-containing acrylic resin, Acryloid AT-400 (Rohm & Haas) is blended with 30 g. of Product B, and 0.5 ml of 70% solution of n-dodecylbenzene sulfonic acid. The clear blend is cast into films on zinc-phosphate treated cold rolled steel and cured at 150° C./20 min. The cured films are hard and resistant to MEK rubbing.

EXAMPLE VI 50 g. of Acryloid AT-400 is blended with 30 g. of Product B, 30 g. of methylated melamine-formaldehyde resin (Cymel 303, American Cyanamid Company) and 0.5 ml of 70% n-dodecylbenzene sulfonic acid catalyst. The cast films on aluminum panes after cure at 150° C./20 minutes are hard and flexible, with good MEK rub resistance.

EXAMPLE VII

50 G. OF Acryloid AT-400 , is blended with 30 g. of Product C, 30 g. of methylated, ethylated glycoluril-formaldehyde resin (Cymel 1171, American Cyanamid Company) and 0.5 ml. of 70% solution of n-dodecylbenzene sulfonic acid. The above blend is cast into films on zinc-phsophate treated cold rolled steel and cured at 150° C./20 min. Cured films are hard and flexible, and resistant to MEK solvent.

EXAMPLE VIII 50 g. of a commercially available acrylic resin with pendant carboxlic acid groups (XC-4011, American Cyanamid Company), is blended with 37.5 g. of Product D, and 25 g. of Cymel 303. The resulting blend is cast into films on zinc-phosphate treated steel and baked at 175° C./20 min. The cured films are hard and resistant to organic solvents.

EXAMPLE IX 50 g. of an experimental acrylic resin (75% solid) containing amide groups (solution polymer of 55% n-butylacrylate, 25% methylmethacrylate, and 20% acrylamide (by wt.) and of molecular weight 1500), 37.5 g. of Product D, and 25 g. of Cymel 325, and 0.5 ml. of 70% solution of n-dodecylbenzene sulfonic acid, are blended together. The clear blend are cast into films on aluminum panels and baked at 150° C./20 min. The cured films are hard and resistant to organic solvents.

EXAMPLE X 70 g. of urethane group-terminated polyurethane (prepared by condensation of 4 moles Urethane D with 3 moles of Product B, MW ~ 1300) is blended with 30 g. Cymel 325, and 0.5 ml of 70% solution n-dodecylbenzene sulfonic acid catalyst. The films are cast from the above-described formulation on zinc-phosphate treated cold rolled steel and baked at 150° C./20 min. The baked films are hard and brittle and resistant to MEK rubbing.

What is claimed is:

1. A thermosetting polyurethane composition comprising:
(a) a polymer having molecular weight of from 500 to 20,000 and containing from about 0.3 to about 15 percent by weight based on total weight of said polymer, of one or more free functional groups selected from —OH, COOH, —CONH$_2$ and $$-O\overset{O}{\overset{\|}{C}}NH_2;\text{ and}$$

(b) a mixture of monomeric and oligomeric polyfunctional substituted urethane compounds, selected from the groups consisting of: (i) monomeric compounds of the formula:

$$\left[A\right]\left[-O-\overset{O}{\overset{\|}{C}}-N\diagup^{R_1}_{R_2}\right]_x$$

wherein:
A is a di- to hexavalent organic moiety;
X is an integer from 2 to 6;
R$_1$ is hydrogen, —CO$_2$OH or —CH$_2$OR$_3$;
R$_2$ is —CH$_2$OH or —CH$_2$OR$_3$; and
R$_3$ is C$_1$ to C$_4$ alkyl,
and (ii) oligomeric compounds of the formula $$[A]\begin{pmatrix}\left[O-\overset{O}{\overset{\|}{C}}-N\diagup^{R_1}_{R_2}\right]_y \\ \left[O-\overset{}{\overset{}{C}}-N-CH_2-N-\overset{}{\overset{}{C}}-O+A\right]_n\end{pmatrix}\begin{pmatrix}\left[O-\overset{}{\overset{}{C}}-N\diagup^{R_1}_{R_2}\right]_w \\ \left[O-\overset{}{\overset{}{C}}-N\diagup^{R_1}_{R_2}\right]\end{pmatrix}$$

wherein:
A, R$_1$ and R$_2$ are as defined in (i)
n is an integer from 1 to 5
w is an integer from 0 to 4
y is an integer from 1 to 5.

2. A composition according to claim 1, further comprising a cross-linkingly effective amount of an acid catalyst for cross-linking of (a) and (b).

3. A composition according to claim 1, wherein R$_1$ is hydrogen and R$_2$ is alkoxymethyl.

4. A composition according to claim 1, wherein [A] is $$\begin{array}{c}CH_2-\\|\\C_2H_5-C-CH_2-\\|\\CH_2-\end{array}$$

5. A composition according to claim 1, further comprising an amino-formaldehyde resin.

6. A composition according to claim 5 wherein said amino-formaldehyde resin is at least partially alkylated.

7. A composition according to claim 5 wherein said amino-formaldehyde resin is selected from the group consisting of melamine-formaldehyde resins, glycouril-formaldehyde resins, urea-formaldehyde resins, and benzoguanamine-formaldehyde resins.

8. A composition according to claim 2, wherein said acid cross-linking catalyst is selected from the group consisting of sulfonic acids, carboxylic acids and phosphoric acid esters.

9. A composition according to claim 8, wherein said acid cross-linking catalyst is a sulfonic acid.

10. A composition according to claim 1, comprising from about 50 to about 90% by weight of polymer (a), from about 10 to about 50% by weight of urethane mixture (b), from 0 to about 40% by weight of an at least partially alkylated aminoformaldehyde resin and from about 0.1 to about 5% by weight of an acid catalyst for cross-linking polymer (a) and urethane mixture (b).

11. A composition according to claim 1, wherein said urethane mixture (b) is derived by reaction of a polyol and isocyanic acid, followed by methylolation and alkylation.

12. A composition according to claim 1, wherein said polymer (a) is selected from the group consisting of polyesters, polyethers, acrylic polymers, vinyl polymers, polyolefins, and mixtures thereof.

13. A composition according to claim 11 wherein said polyol is selected from the group consisting of trimethylolpropane; ethylene glycol; 1,3-butanediol; 1,4-butanediol; cyclohexane-dimethanol; neopentyl glycol; polyether polyols; and polyester diols.

14. A composition according to claim 1 wherein said monomeric urethane compound (b)(i) is

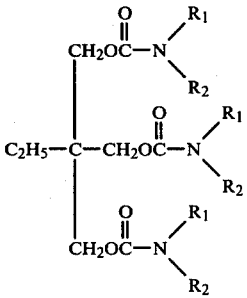

15. A composition according to claim 14 wherein said urethane mixture (b) is derived by reaction of 1,1,1-trimethylolpropane and isocyanic acid followed by methylolation with formaldehyde and alkylation with methanol.

16. A thermosetting polyurethane composition comprising:

(a) a polymer having molecular weight of from 500 to 10,000 and containing from about 0.3 to about 5 percent by weight based on total weight of said polymer, of one or more free functional groups selected from —OH, —COOH, —CONH$_2$ and

(b) a mixture of monomeric and oligomeric polyfunctional substituted urethane compounds, selected from the groups consisting of: (i) monomeric compounds of the formula

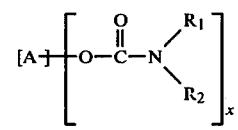

wherein:
A is a di- to hexavalent organic moiety;
X is an integer from 2 to 6;
R$_1$ is hydrogen, —CH$_2$OH or —CH$_2$OR$_3$;
R$_2$ is —CH$_2$OH or —CH$_2$OR$_3$; and
R$_3$ is C$_1$ to C$_4$ alkyl,
and (ii) oligomeric compounds of the formula

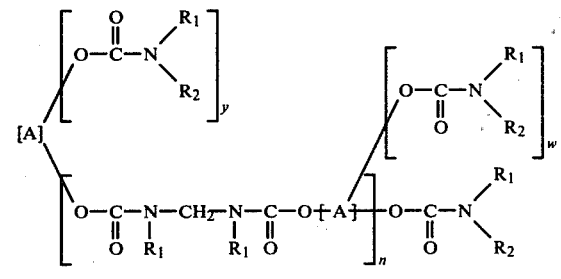

wherein:
A, R$_1$ and R$_2$ are as defined in (i)
n is an integer from 1 to 5
w is an integer from 0 to 4;
y is an integer from 1 to 5;
said urethane mixture being derived by reaction of a polyol and isocyanic acid, followed by methylolation with an aldehyde and alkylation with an alcohol.

* * * * *